United States Patent
Pierrot et al.

(10) Patent No.: US 9,249,041 B2
(45) Date of Patent: Feb. 2, 2016

(54) FURNACE WITH IMMERSED BURNER AND OVERHEAD BURNER

(75) Inventors: Laurent Pierrot, Paris (FR); Frederic Lopepe, Salinas (ES); Biagio Palmieri, Compiegne (FR); Laurent Joubaud, Paris (FR); Philippe Pedeboscq, Mareil Marly (FR); Philippe Meunier, Bizanos (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 438 days.

(21) Appl. No.: 12/295,663

(22) PCT Filed: Apr. 4, 2007

(86) PCT No.: PCT/FR2007/051069
§ 371 (c)(1),
(2), (4) Date: Feb. 2, 2009

(87) PCT Pub. No.: WO2007/116183
PCT Pub. Date: Oct. 18, 2007

(65) Prior Publication Data
US 2009/0235695 A1    Sep. 24, 2009

(30) Foreign Application Priority Data

Apr. 7, 2006  (FR) ..................... 06 51258

(51) Int. Cl.
*C03B 5/00* (2006.01)
*C03B 5/20* (2006.01)
*C03B 5/235* (2006.01)

(52) U.S. Cl.
CPC . *C03B 5/20* (2013.01); *C03B 5/202* (2013.01); *C03B 5/2356* (2013.01); *Y02P 40/57* (2015.11)

(58) Field of Classification Search
CPC ..................................... C03B 5/2356
USPC .......... 65/355, 356, 347, 135.9, 136.2, 136.3, 65/134.5
See application file for complete search history.

(56) References Cited

U.S. PATENT DOCUMENTS 4,544,396 A * 10/1985 Krumwiede et al. ........... 65/178
5,139,558 A    8/1992 Lauwers (Continued)

FOREIGN PATENT DOCUMENTS

EP    1 236 691    9/2002
JP    50-10810    2/1975

(Continued)

OTHER PUBLICATIONS

SU 425853 (human translation), submitted by the Applicant on Aug. 31, 2011.*

(Continued)

*Primary Examiner* — Richard Crispino
*Assistant Examiner* — Yana B Krinker
(74) *Attorney, Agent, or Firm* — Oblon, McClelland, Maier & Neustadt, L.L.P.

(57) ABSTRACT

A furnace for melting batch materials, including, upstream in the direction of flow of the molten materials, a zone for introducing solid batch materials, and including a submerged burner and an overhead surface burner providing a flame that touches the surface of the glass at the point where the bubble from the submerged burner emerges. This association of an overhead, especially roof-mounted, burner and a submerged burner reduces the quantity of batch stones that may be sent toward the downstream end of the furnace.

17 Claims, 2 Drawing Sheets

(56) References Cited

U.S. PATENT DOCUMENTS

Figure 1:
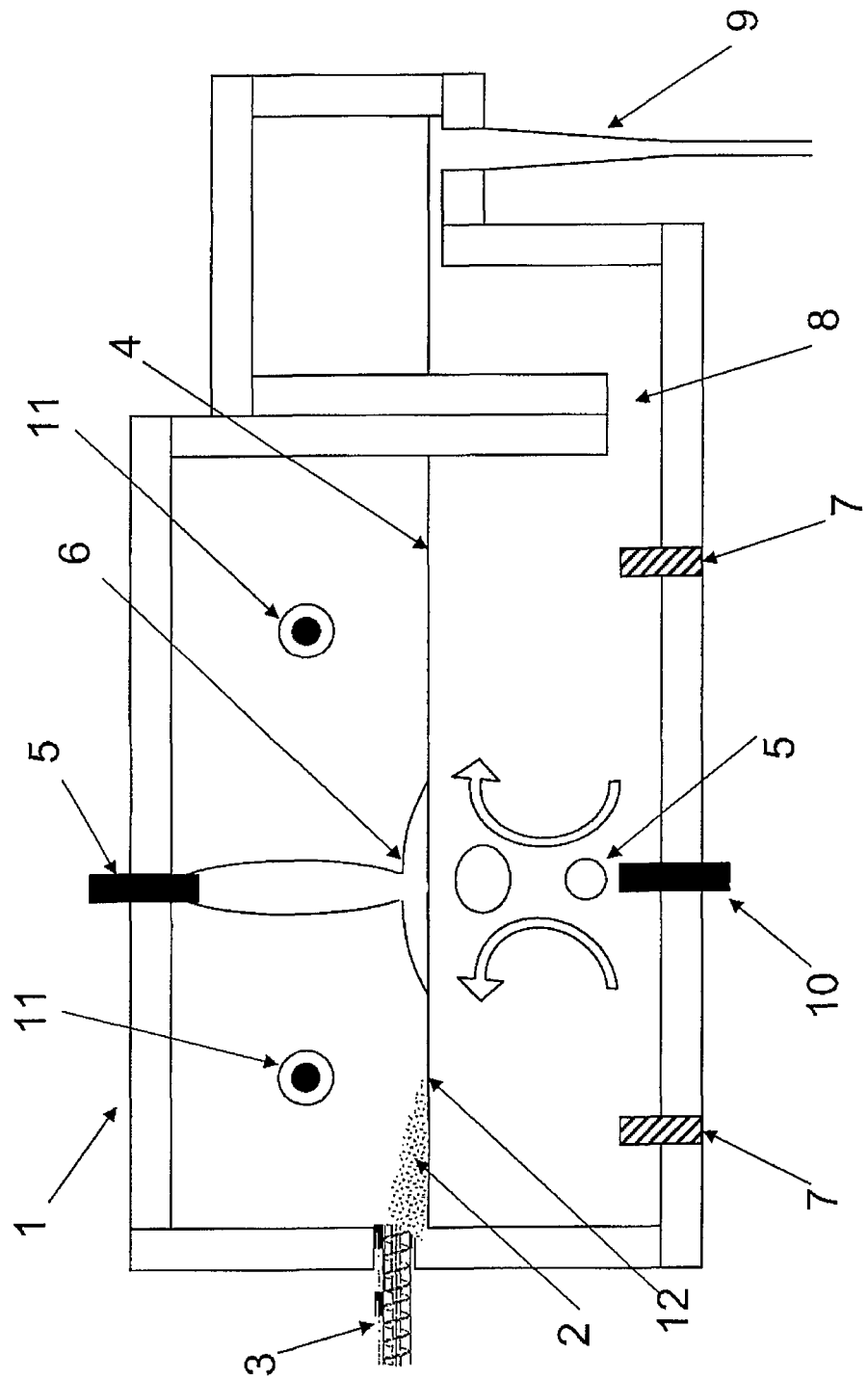

| | | | |
|---|---|---|---|
| 6,705,117 B2 * | 3/2004 | Simpson et al. | 65/134.4 |
| 6,722,161 B2 * | 4/2004 | LeBlanc | 65/134.4 |
| 2002/0166343 A1 | 11/2002 | LeBlanc | |
| 2005/0039491 A1 * | 2/2005 | Maugendre et al. | 65/121 |
| 2006/0000239 A1 * | 1/2006 | Jeanvoine et al. | 65/134.7 |

FOREIGN PATENT DOCUMENTS

| | | | | |
|---|---|---|---|---|
| JP | 5-116952 A | 5/1993 | | |
| JP | 2002-284532 A | 10/2002 | | |
| JP | 2002-356331 | 12/2002 | | |
| JP | 2004-526656 A | 9/2004 | | |
| SU | 425 853 | 10/1974 | | |
| SU | 425853 | * 10/1974 | | C03B 5/00 |
| WO | 02 090271 | 11/2002 | | |

OTHER PUBLICATIONS

Office Action issued Jul. 3, 2012 in Japanese Patent Application No. 2009-503631 (with English-language translation).

Office Action issued on Apr. 9, 2013 in the corresponding Japanese Patent Application No. 2009-503631 (with English Translation).

* cited by examiner

FURNACE WITH IMMERSED BURNER AND OVERHEAD BURNER

CROSS-REFERENCE TO RELATED APPLICATIONS

The present application is the U.S. counterpart of WO 2007/116183 and claims priority to French application no. 0651258 filed on Apr. 7, 2006, the entire contents of each of which are hereby incorporated herein by reference.

The invention relates to a furnace for melting glass-forming batch materials, comprising a submerged burner combined with an overhead burner. The submerged burner may especially act as a dam to the solid batch materials. The overhead, especially roof-mounted, burner has a flame that impacts the surface of the glass melt above the flame of the submerged burner, and contributes to melting the batch materials.

Submerged burners for melting glass are known, especially from WO 99/35099 and WO 99/37591. Roof-mounted burners for melting glass are known, especially from WO 02/092521, U.S. Pat. No. 6,237,369, WO 99/31021 and WO 02/090271. In other documents, mention may be made of SU 425 853, U.S. Pat. No. 5,139,558, EP 1 236 691, JP2002284532, U.S. Pat. No. 5,922,097 and US 2002166343.

The batch materials are introduced upstream of the furnace. For good quality of the glass, it is desirable for them to be perfectly melted, that is to say there should be no batch stones in the final glass. Now, it is difficult to prevent certain batch materials flowing through the furnace more rapidly than others and emerging as batch stones, mixed with the molten glass, to the detriment of the homogeneity and optical quality of the final glass. The present invention helps to solve this problem.

According to the invention, at least one submerged burner is associated with at least one overhead, especially roof-mounted, burner, the flame of which impacts the surface of the glass melt above the flame (or bubble, considering the fact that it is generally combustion gases that emerge from the molten glass and not a flame) of the submerged burner, so as to produce a locally very hot zone on the surface of the glass and to eliminate the batch stones by succeeding in melting them. This device may be supplemented with a dam of submerged burners in order to further increase the effectiveness of the device and to melt the solid materials. Hereafter, overhead burner may be referred to as "surface burner", the flame of which impacts the surface of the glass above the flame of the submerged burner. Thus, the furnace according to the invention is fitted with at least one overhead burner, said overhead burner being associated with at least one submerged burner, the flame of said overhead burner touching the surface of the glass melt at the point where the bubble from said submerged burner emerges. Such an overhead burner is called "surface burner" within the context of the present invention. According to the invention, a dam comprising at least one submerged burner prevents the batch materials from passing downstream of said dam. The batch materials can therefore pass beyond the dam only in the molten state. The dam also delivers heat contributing to melting the entire batch material passing through it.

The submerged burner raises the coolest (melted and unmelted) materials, which are found of course at the bottom of the furnace, up to the surface and sends them downstream of the furnace after they have been reheated. The surface burner that is associated with said submerged burner helps to speed up the melting in combination with the submerged burner itself.

Thus, the invention firstly relates to a furnace for melting batch materials, comprising, upstream in the direction of flow of the molten materials, a zone for introducing solid batch materials, said furnace comprising a submerged burner and a surface burner, which is an overhead burner, providing a flame that touches the surface of the glass at the point where the bubble from the submerged burner emerges.

The invention relates to the principle of combining a submerged burner with a surface burner, especially a roof-mounted burner, it being possible for said submerged burner to have the function of acting as a barrier for the batch materials. The flame emanating from the surface burner impacts the glass above the flame (or the bubble, considering the fact that it is generally combustion gases that emerge from the molten glass and not a flame) of the submerged burner so as to produce a locally very hot zone on the surface. Since the submerged burner causes the coldest materials to rise to the surface, these materials are reheated on the one hand by the flame of the submerged burner and on the other hand by that of the surface burner. This is a means for directly injecting heat into the coolest materials. Such effectiveness cannot be achieved if the submerged burner is replaced with a boiler (unignited gases) or recovered combustion flue gases, since these gases would contribute to precooling the raised materials, which would be counter-productive.

The surface burner (generally roof-mounted), which is designed so that the combustion of the gases takes place level with the bubble from the submerged burner, selectively heats the cool glass rising to the surface. The heat transfer, which depends on the temperature difference between the hot source and the cool point, is therefore greatly improved. Thus, working with a constant glass output, the invention makes it possible to reduce the energy consumption. By keeping the superstructure temperatures (upper temperature limit that the materials constituting the furnace can support) constant, it is also possible to increase the output.

The submerged burner may also form part of a dam of submerged burners, each producing convection currents in the glass melt and preventing the solid batch materials from going toward the downstream end of the furnace. In particular if the furnace is wide, it is preferred to form a batch dam by a multiplicity of submerged burners. These submerged burners are therefore preferably placed in line across the main direction of flow of the molten materials. This main direction corresponds to the upstream-to-downstream direction, along the axis of the furnace. The submerged burners may be slightly offset relative to a straight line, provided that the dam effect is obtained. The bubbles emanating from the submerged burners impress a convective movement on the solid materials and send them back toward the upstream of the furnace. There are therefore as many submerged burners for forming this dam as the width of the furnace so requires, it being understood that each submerged burner will have a dam effect over a radius slightly larger than that of its emerging bubble. The unmelted batch materials are sent upstream. Only molten material can pass beyond the dam. The submerged-burner dam reheats the unmelted materials and, as the case may be, ends up by melting them. The unmelted materials follow convection loops upstream of the dam as many times as is necessary to melt them. The effectiveness of the dam system is increased by the fact that an overhead burner provides a flame that impacts the surface of the glass ("surface burner") at the place where the bubble from the submerged burner emerges. If the dam comprises only a single submerged burner, this is generally located at mid-width of the furnace (at mid-distance between the side walls of the furnace). If the dam comprises several submerged burners, it is possible to provide only a single surface burner, preferably the flame of which touches the surface of the glass at mid-width of the glass melt. However, it is preferred to provide as many surface burners as submerged burners, said surface burners being preferably placed vertically in line with each submerged burner so that the flame from a surface burner touches (with a pronounced impact) the point of emergence of the flame (or bubble) of a submerged burner. The dam therefore comprises submerged burner/surface burner pairs, each submerged burner being associated with a surface burner.

The furnace according to the invention may comprise several (2 or 3 or even more) successive dams along the path of the molten materials, each dam comprising, each time, at least one submerged burner.

Preferably, the gases emanating from each surface burner arrive with quite a high velocity at the surface of the glass, for example with a velocity of at least 15 meters per second. This velocity may be much higher, and it has to be regulated depending on the risk of material fly-off from the surface of the melt pool. In particular if the flame of the surface burner arrives near a heap of batch, it is preferred to limit the velocity of its gases so as not to cause material to fly off this heap. This velocity may for example be up to 150 m/s, but in the case of a risk of batch fly-off it is preferably up to 40 m/s.

In the case of forming a dam of submerged burners, the number of submerged burners to be used to form the dam is that sufficient for the unmelted materials not to pass beyond it but to be sent back upstream. Approximately, it is generally necessary to place a number $N_{min}$ of submerged burners across the path of the batch materials such that $N_{min}$ is at least equal to the integer part of [80% of L/2H], where L is the width of the furnace and H is the height of the glass melt (molten glass) in the furnace (for example, if the furnace has a width of 3 m and the glass height is 0.5 m, then L/2H=3, therefore 80% of L/2H is 2.4, and the integer part of which is 2, and therefore $N_{min}$ is at least equal to 2). Even more preferably, a number $N_{min}$ of submerged burners across the path of the batch materials is placed such that $N_{min}$ is at least equal to the integer part of L/2H (for example, if the furnace has a width of 3 m and the glass height is 0.5 m, then L/2H=3, and therefore $N_{min}$ is preferably at least equal to 3). In general, it is sufficient to place in the dam a number of $N_{suff}$ of submerged burners such that $N_{suff}$ is at most equal to 1+ the integer part of [120% of L/2R], where L is the width of the furnace and R is the radius of the emerging bubble of a submerged burner. More generally still, it is even sufficient to place in the dam a number $N_{suff}$ of submerged burners such that $N_{suff}$ is at most equal to 1+the integer part of [L/2R].

The diameter of the emerging bubble of a submerged burner may be determined by visual observation.

By way of indication, the radius R (in meters) of the bubble of a submerged burner (fed with pure oxygen as oxidizer and with methane as fuel) at the moment when it reaches the surface is at least equal to:

$$R = \frac{[3 \times 0.87 \times 3.10^{-7} \times T \times P \times \eta^{1/3}]^{1/3}}{4 \times 3.14}$$

in which:
T is the temperature of the glass in kelvin;
P is the power of the burner in kW; and
η is the kinematic viscosity of the glass in m²/s.

In reality, its diameter is slightly larger owing to the effect of the bubble collapsing on arriving at the surface. The actual diameter is therefore about 10 to 20% greater than that given by the formula.

The power of a submerged burner may for example range from 10 to 150 kW. The power of a transverse overhead burner may for example range from 100 to 1000 kW, while the power of a surface overhead burner may for example range from 300 to 3000 kW.

In a dam of submerged burners, all the submerged burners are placed regularly, at regular intervals, across the glass melt so as to produce the dam. If the dam comprises several submerged burners, it includes two submerged burners each closer to one of the side walls of the furnace. These burners placed at the ends of the dam are at a distance d from their closest wall. In this case, the distance between two submerged burners in the same dam is preferably 2d. Preferably, 2d corresponds substantially to the diameter of the bubble emerging from the submerged burner.

The furnace according to the invention may therefore have a dam comprising several submerged burners, a different surface burner being associated with each submerged burner of the dam.

The furnace according to the invention may be fitted with transverse overhead burners.

In addition to the combination of submerged burner and the surface burner associated with it, and also the possible dam of one or more submerged burners, the furnace may also be fitted with overhead transverse burners, passing through the side walls of the furnace. Pairs of electrodes heating molten glass directly, especially through the floor, may also participate in the overall heating of the furnace.

Compared with a conventional furnace fitted with overhead burners (the flame of which is not especially directed toward the surface of the glass melt), the invention considerably improves the heat transfer to the glass pool. This is because the submerged burner increases the convection in the furnace and continuously causes the cool glass to rise to the surface of the glass pool. This increase in convection takes place without cooling the floor, thereby preventing simple bubbling of cool gases or flue gases.

Moreover, in general the volume of gas sent by a bubbler represents only 10% of the volume of gas generated by a submerged burner. Combustion flue gases generally have a temperature of around 1500 to 1600° C., whereas a submerged burner flame has a higher temperature, especially above 1800° C., from about 2000° C. (more in the case of air/combustible gas combustion) to 2500° C. (more in the case of oxygen/combustible gas combustion). The combustion gases rapidly cool as soon as they have to be transported. Compared with a bubbler (even fed with hot combustion gases), a submerged burner provides much more thermal energy directly into the glass owing to the combustion that takes place directly therein.

The batch materials may be introduced above the glass pool, in which case they form a batch heap that can float (depending on their nature) on the molten material. They may also be introduced from beneath the glass pool. The submerged burner (and therefore also the possible dam of which it forms part) is generally placed between the end of the batch heap and the outlet of the furnace, for example between the end of the batch heap and the middle of the furnace between its inlet and its outlet. In fact, compared with the batch heap that would form in the absence of a submerged burner and in the absence of a surface burner, it is advantageous to place the submerged burner at the end of said heap so that it clips (i.e. shortens) said heap. This aspect is more particularly developed in FIG. 2. The invention therefore also relates to the method whereby the batch materials are introduced above the glass melt and form a batch heap, the submerged burner (and therefore also the possible dam of which it forms part) being placed at the end of said heap.

The batch materials may comprise raw materials, but also cullet or even waste intended to be vitrified. They may also include combustible (organic) elements: thus, for example, sized mineral fibers, with a binder (of the type of those used in thermal or acoustic insulation or those used in the reinforcement of plastics), laminated glazing with sheets of polymer of the polyvinyl butyral type, such as windscreens, or any type of "composite" material combining glass and plastics, such as some bottles, may be recycled. It is also possible to recycle "glass/metal or glass/metal-compound composites" such as glazing functionalized with coatings containing metals, hitherto difficult to recycle as this would run the risk of progressively enriching the melting chamber with metals, which accumulate on the surface of the floor. However, the stirring imposed by the melting caused by the submerged burner(s) prevents this sedimentation and thus makes it possible for example to recycle glazing coated with enamel layers, metal layers and/or various connection elements.

All or part of the batch materials may be introduced into the melting chamber below the level of the mass of batch materials in the process of melting. Some of these materials may be introduced, as is usual, from above the mass undergoing liquefaction and the remainder from below, for example by feed means of the endless screw type. It is thus possible to introduce the materials directly into the mass being liquefied, at a single point or at various points distributed within the walls of the melting chamber. Such introduction directly into the mass of material being liquefied (the "glass pool") is advantageous on more than one count: firstly, it considerably reduces all the risks of fly-off of raw materials above the glass pool, and therefore minimizes the amount of solid dust emitted by the furnace. Secondly, it allows better control of the minimum residence time of said materials, before extraction into the refining zone, and allows them to be introduced selectively at the point where the convective stirring is strongest, depending on the arrangement of the submerged burners. Said point(s) of introduction into the glass pool may thus be located near the surface, or more deeply in the glass pool, for example at a glass-pool height between 1/5th and 4/5th of the total depth of the glass pool starting from the floor level.

Each burner (whether a submerged burner or transverse or surface overhead burner) is fed with an oxidizer and a fuel. The oxidizer in particular be air or oxygen or oxygen-enriched air. The fuel may or may not be of the gaseous fossil fuel type, such as natural gas, propane, liquid fuel oil or any other hydrocarbon fuel. It may also be hydrogen, in particular in the case of submerged burners. Combining the use of an oxygen oxidizer with the use of a hydrogen fuel in the melting by submerged burners is a good way of ensuring effective heat transfer of the energy of the burners into the molten glass, which moreover results in a completely "clean" process, that is to say with no emission of nitrogen oxides NOx nor of greenhouse gases of the COx type, other than that that may arise from decarbonation of the raw materials.

According to the invention, a surface burner is associated with a submerged burner, the flame of the surface burner touching, with a high velocity, the point where the combustion gases emerge from the submerged burner. In particular, provision may be made for the submerged burner to be superstoichiometric in oxygen (that is to say enriched with oxygen compared with that sufficient to burn all the fuel feeding the submerged burner) and for the surface burner associated with it to be superstoichiometric in combustible gas (that is to say enriched with fuel compared with that sufficient to react with all of the oxidizer feeding the surface burner). In this way, secondary combustion takes place on the surface of the glass between, on the one hand, the excess oxygen from the submerged burner and the excess fuel on the surface burner, in the sense that there is well-localized additional heating at the surface of the glass, through which place the unmelted materials pass. It is also possible to do the opposite, that is to say to feed the submerged burner so as to be superstoichiometric in combustible gas and the surface burner so as to be superstoichiometric in oxygen in order to obtain this secondary combustion on the surface of the glass.

Each submerged burner causes intense stirring of the batch materials by convection: convection loops thus form on either side of the combustion sites or "flames" or streams of combustion gases, continuously mixing molten and as yet unmelted materials very effectively. This has the very favorable characteristics of "agitated" melting without necessarily having to use mechanical agitation means, which are not very reliable and/or subject to rapid wear.

This type of melting by submerged burners makes it possible to considerably reduce the emission of any type of dust in the melting chamber and of NOx-type gases, since the heat exchange takes place very rapidly, avoiding the temperature peaks liable to promote formation of these gases. It also considerably reduces the emission of $CO_2$-type gases, the total energy consumption of the plant being lower than with conventional devices (only by means of overhead burners operating for example in inversion mode).

Optionally, the melting may be preceded by a step of preheating the batch materials, but to a temperature substantially below that needed to liquefy them, for example to at most 900° C. To carry out this preheating, it may be advantageous to recover the thermal energy of the flue gases. Thus, by extracting their heat it is possible overall to reduce the specific energy consumption of the plant.

The glass is generally refined either downstream of the same furnace and/or in a refining compartment downstream of the furnace. After refining, the glass may exit via a channel, but the invention also applies to furnaces without channels. In particular, after refining, the glass may continuously feed a plant for forming flat glass, such as a float bath for glass.

FIG. 1 shows a furnace 1 according to the invention seen from one side. This furnace is fed with batch materials 2 forming a batch heap upstream of the furnace, by means of a furnace feed device 3 (endless screw) emerging just above the level 4 of the glass pool. A submerged burner 10 generates a flame 5 in the form of bubbles that rise to the surface. This rise to the surface produces convection currents represented by arrows. The unmelted materials coming from the batch heap 2 (the end of the batch heap is at 12), and approaching the point where the flame of the submerged burner emerges, are pushed back upstream owing to these convection currents. A roof-mounted overhead burner 5 produces a flame 6 that impacts the surface of the molten glass. Thus, the unmelted materials are heated by the flame of the submerged burner and by the flame of the roof-mounted burner. The heating of the furnace is supplemented with pairs of electrodes 7 and with transverse overhead burners 11 placed in the side walls of the furnace. The molten glass flows toward the downstream of the furnace, passes via a channel 8 and flows out through an orifice at 9.

Figure 2:
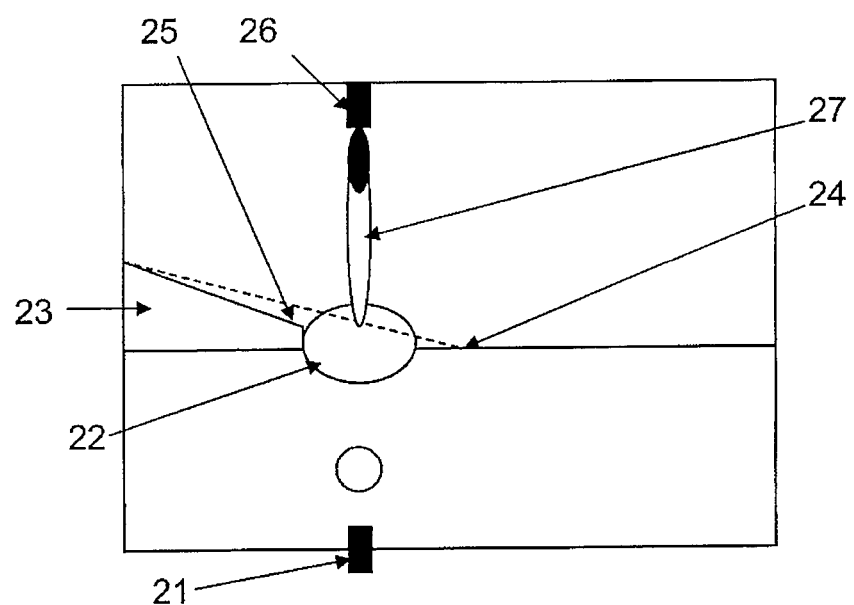

FIG. 2 shows schematically the preferred place for positioning the submerged burner 21 (and therefore also the possible dam of which it forms part). A bubble 22 filled with combustion gases emerges at the surface vertically above this burner 21. Preferably, the burner is positioned at the end of the batch heap 23 in such a way that it contributes to clipping said heap. The dotted line represents the shape of the batch heap in the absence of a submerged burner and in the absence of a surface burner. The end of this heap would reach the point 24. The submerged-burner dam clips the end of this heap so that this end now lies at the point 25. The surface burner 26 is positioned vertically above the submerged burner and its flame 27 touches the surface of the glass at the point where the bubble 22 emerges from the submerged burner 21. The surface burner also contributes to shortening the end of the heap. Thus, the submerged burner is positioned below the end of the batch heap that would form in its absence (shown by the dotted line), so that finally, when it is operating, said submerged burner lies just downstream (relative to the direction of flow of the glass) of the batch heap.

The invention claimed is:

1. A furnace for melting batch materials, comprising:
a zone to introduce solid batch materials, upstream in a direction of flow of molten materials;
one or more submerged burners, each submerged burner producing convection currents in a glass melt of the molten materials; and
an overhead burner, such that at least one of the submerged burners is associated with the overhead burner, wherein
the overhead burner is directly vertically above and aligned with the associated submerged burner, the overhead burner providing a flame that touches a surface of the glass melt at a point where a bubble from the associated submerged burner emerges, and heat from both the flame provided by the overhead burner and a flame provided by the associated submerged burner is concentrated at one point on the surface of the glass melt, and wherein
the one or more submerged burners forming a dam, the dam created by the convection currents produced by the one or more submerged burners sending the solid batch materials toward the upstream of the furnace thereby preventing the solid batch materials from passing over any of the submerged burners toward a downstream end of the furnace.

2. The furnace as claimed in claim 1, wherein each submerged burner of the dam is associated with a different overhead burner.

3. The furnace as claimed in claim 1, wherein a number of submerged burners in the dam is at least equal to an integer part of [80% of L/2H], where L is the width of the furnace and H is the height of the glass melt in the furnace.

4. The furnace as claimed in claim 1, comprising plural successive dams of submerged burners along a path of the molten materials.

5. The furnace as claimed in claim 1, wherein a power of the overhead burner is greater than a power of one of the one or more submerged burners.

6. The furnace as claimed in claim 1, wherein one of the overhead burner and one of the one or more submerged burners is superstoichiometric in oxygen, and the other of the overhead burner and the one of the one or more submerged burners is superstoichiometric in combustible gas.

7. The furnace as claimed in claim 1, wherein the furnace includes a plurality of the submerged burners in a same dam are spaced at regular intervals each equal to a distance, and two of the submerged burners in the same dam closest to side walls of the furnace are each spaced from their closest side wall of the furnace by half of the distance.

8. The furnace as claimed in claim 1, wherein the zone to introduce the solid batch materials introduces a heap of the solid batch materials, and the dam created by the convection currents produced by the one or more submerged burners clips an end of the heap.

9. A method of melting batch materials, comprising:
carrying out melting in a furnace including
a zone to introduce solid batch materials, upstream in a direction of flow of molten materials;
one or more submerged burners, each submerged burner producing convection currents in a glass melt of the molten materials; and
an overhead burner, such that at least one of the submerged burners is associated with the overhead burner, wherein
the overhead burner is directly vertically above and aligned with the associated submerged burner, the overhead burner providing a flame that touches a surface of the glass melt at a point where a bubble from the associated submerged burner emerges, and heat from both the flame provided by the overhead burner and a flame provided by the associated submerged burner is concentrated at one point on the surface of the glass melt, and wherein
the one or more submerged burners forming a dam, the dam created by the convection currents produced by the one or more submerged burners sending the solid batch materials toward the upstream of the furnace thereby preventing the solid batch materials from passing over any of the submerged burners toward a downstream end of the furnace.

10. The method as claimed in claim 9, wherein the batch materials are introduced above the glass melt and form a batch heap, a plurality of submerged burners being positioned at an end of the batch heap.

11. The method as claimed in claim 9, wherein gases from the overhead burner arrives at the surface of the glass melt with a velocity of at least 15 meters per second.

12. The method as claimed in claim 9, wherein a flame of the submerged burners is at a temperature above 1800° C.

13. A furnace for melting batch materials, comprising:
a zone to introduce solid batch materials, upstream in a direction of flow of molten materials;
a single row of one or more submerged burners, each submerged burner producing convection currents in a glass melt of the molten materials; and
an overhead burner, such that at least one of the submerged burners is associated with the overhead burner, wherein
the overhead burner is directly vertically above and aligned with the associated submerged burner, the overhead burner providing a flame that touches a surface of the glass melt at a point where a bubble from the associated submerged burner emerges, and heat from both the flame provided by the overhead burner and a flame provided by the associated submerged burner is concentrated at one point on the surface of the glass melt, and wherein
the one or more submerged burners forming a dam, the dam created by the convection currents produced by the one or more submerged burners sending the solid batch materials toward the upstream of the furnace thereby preventing the solid batch materials from passing over any of the submerged burners toward a downstream end of the furnace, the single row of one or more submerged burners being the only row of submerged burners in the furnace.

14. The furnace as claimed in claim 13, wherein the furnace includes no other submerged burners other than those of the single row.

15. A method of melting batch materials, comprising:
carrying out melting in a furnace including
a zone to introduce solid batch materials, upstream in a direction of flow of molten materials;

a single row of one or more submerged burners, each submerged burner producing convection currents in a glass melt of the molten materials; and an overhead burner, such that at least one of the submerged burners is associated with the overhead burner, wherein the overhead burner is directly vertically above and aligned with the associated submerged burner, the overhead burner providing a flame that touches a surface of the glass melt at a point where a bubble from the associated submerged burner emerges, and heat from both the flame provided by the overhead burner and a flame provided by the associated submerged burner is concentrated at one point on the surface of the glass melt, and wherein the one or more submerged burners forming a dam, the dam created by the convection currents produced by the one or more submerged burners sending the solid batch materials toward the upstream of the furnace thereby preventing the solid batch materials from passing over any of the submerged burners toward a downstream end of the furnace, the single row of one or more submerged burners being the only row of submerged burners in the furnace.

16. The method as claimed in claim 15, wherein the furnace includes no other submerged burners other than those of the single row.

17. The method as claimed in claim 15, wherein each of the submerged burners has an overhead burner disposed vertically above.

* * * * *